(12) United States Patent
Cox (10) Patent No.: US 8,160,240 B2
(45) Date of Patent: Apr. 17, 2012

(54) ECHO CANCELLATION BALANCE USING NOISE GENERATOR AND AVERAGE POWER DETECTION

(75) Inventor: Edward Warren Cox, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 961 days.

(21) Appl. No.: 12/127,818

(22) Filed: May 28, 2008

(65) Prior Publication Data
US 2009/0296920 A1 Dec. 3, 2009

(51) Int. Cl.
*H04M 9/08* (2006.01)

(52) U.S. Cl. .............. 379/406.07; 379/406.08; 370/287; 375/285

(58) Field of Classification Search . 379/406.01–406.16
See application file for complete search history.

(56) References Cited

U.S. PATENT DOCUMENTS

| | | | | |
|---|---|---|---|---|
| 4,897,832 | A * | 1/1990 | Suzuki et al. | 370/287 |
| 6,426,979 | B1 * | 7/2002 | Yang et al. | 375/285 |
| 6,504,838 | B1 * | 1/2003 | Kwan | 370/352 |
| 2003/0086382 | A1 | 5/2003 | Song et al. | 370/286 |
| 2003/0235244 | A1 * | 12/2003 | Pessoa et al. | 375/232 |
| 2004/0100916 | A1 * | 5/2004 | Bershad et al. | 370/286 |
| 2008/0253357 | A1 * | 10/2008 | Liu et al. | 370/352 |

FOREIGN PATENT DOCUMENTS

| | | |
|---|---|---|
| DE | 10353494 A1 | 9/2004 |
| EP | 0 708 538 A1 | 4/1996 |
| WO | WO 00/67391 | 11/2000 |

OTHER PUBLICATIONS

Extended European Search Report from European Application No. 09251408.2 dated Nov. 30, 2009.
Legerity ISLAC™ Devices Adaptive Echo Cancellation Feature Intelligent Subscriber Line Audio-processing Circuit (ISLAC), Oct. 29, 2001.

* cited by examiner

*Primary Examiner* — Fan Tsang
*Assistant Examiner* — Ibraham Sharifzada
(74) *Attorney, Agent, or Firm* — Williams, Morgan & Amerson, P.C.

(57) ABSTRACT

A communication system includes transmit and receive paths, a balancing filter, a noise generator, a detector, and an interface. The transmit path is operable to generate data for communication on a communication network. The receive path is operable to receive data from the communication network. The balancing filter is coupled between the transmit path and the receive path. The noise generator is operable to inject a noise signal on the receive path. The detector is operable to measure reflected power in the transmit path associated with the noise signal. The interface is operable to receive a plurality of sets of coefficients for configuring the balancing filter, wherein the detector is operable to measure the reflected power for each of the sets of coefficients.

16 Claims, 4 Drawing Sheets

ECHO CANCELLATION BALANCE USING NOISE GENERATOR AND AVERAGE POWER DETECTION

CROSS-REFERENCE TO RELATED APPLICATIONS

Not applicable.

BACKGROUND

The disclosed subject matter relates generally to communication systems and, more particularly, to a system and method for performing echo cancellation balance using noise generator and average power detection.

The traditional telephone network is based on assigning distinct lines or "circuits" to each connected call. When a user lifts a telephone handset and goes off-hook, the local central office provides a dial tone to the caller and assigns a "circuit" to him or to her. Once the desired number has been dialed, the call is switched to one or more intermediary central offices before finally reaching the destination. The Public Switched Telephone Network (PSTN), or the conventional telephone network as we know it today, relies on the use of circuit-switched connections.

The tremendous growth of the Internet and other computer networks has given rise to a new telephone technology, which is fundamentally different from the traditional PSTN. Known as voice over network (VON), this new technology relies on packet-oriented digital networks to deliver voice communication services as a digital stream. By sampling speech and recording it in digital form, encoding the digitized speech into packets, and transmitting the packets across computer networks, VON systems offer a lower cost alternative to PSTN due to their inherent efficiencies and lower bandwidth requirements.

Several communication protocols are used to deliver packet-based VON services. They include voice over the Internet Protocol (VoIP), voice over frame relay, voice over asynchronous transfer mode, voice over digital subscriber line, and voice over cable.

One issue that arises in VON telephony is echo cancellation. Poor echo cancellation reduces user satisfaction. Typically, VON network service providers implement some sort of echo cancellation on the packetized data. However, for the network echo cancellation filters to converge effectively, some degree of preliminary echo cancellation is useful on the unpacketized data. Such echo cancellation typically is done digitally by the interface circuit prior to generating an analog signal for transmitting over the PSTN. Generally, an echo cancellation filter is employed to reduce the echo. The filter typically has multiple taps, each with an assigned weighting coefficient.

Echo cancellation using a least mean square (LMS) technique to set the filter coefficients is known in the art. However, this technique places significant processing resources on the interface circuitry, thereby increasing its cost.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a communication system including transmit and receive paths, a balancing filter, a noise generator, a detector, and an interface. The transmit path is operable to generate data for communication on a communication network. The receive path is operable to receive data from the communication network. The balancing filter is coupled between the transmit path and the receive path. The noise generator is operable to inject a noise signal on the receive path. The detector is operable to measure reflected power in the transmit path associated with the noise signal. The interface is operable to receive a plurality of sets of coefficients for configuring the balancing filter, wherein the detector is operable to measure the reflected power for each of the sets of coefficients.

Another aspect of the disclosed subject matter is seen in a method that includes generating data in a transmit path for communication on a communication network. Data is received in a receive path from the communication network. A balancing filter coupled between the transmit path and the receive path is provided. A noise signal is injected on the receive path. Reflected power in the transmit path associated with the noise signal is measured. A plurality of sets of coefficients for configuring the balancing filter is received. The injecting and measuring are repeated to measure the reflected power for each of the sets of coefficients.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
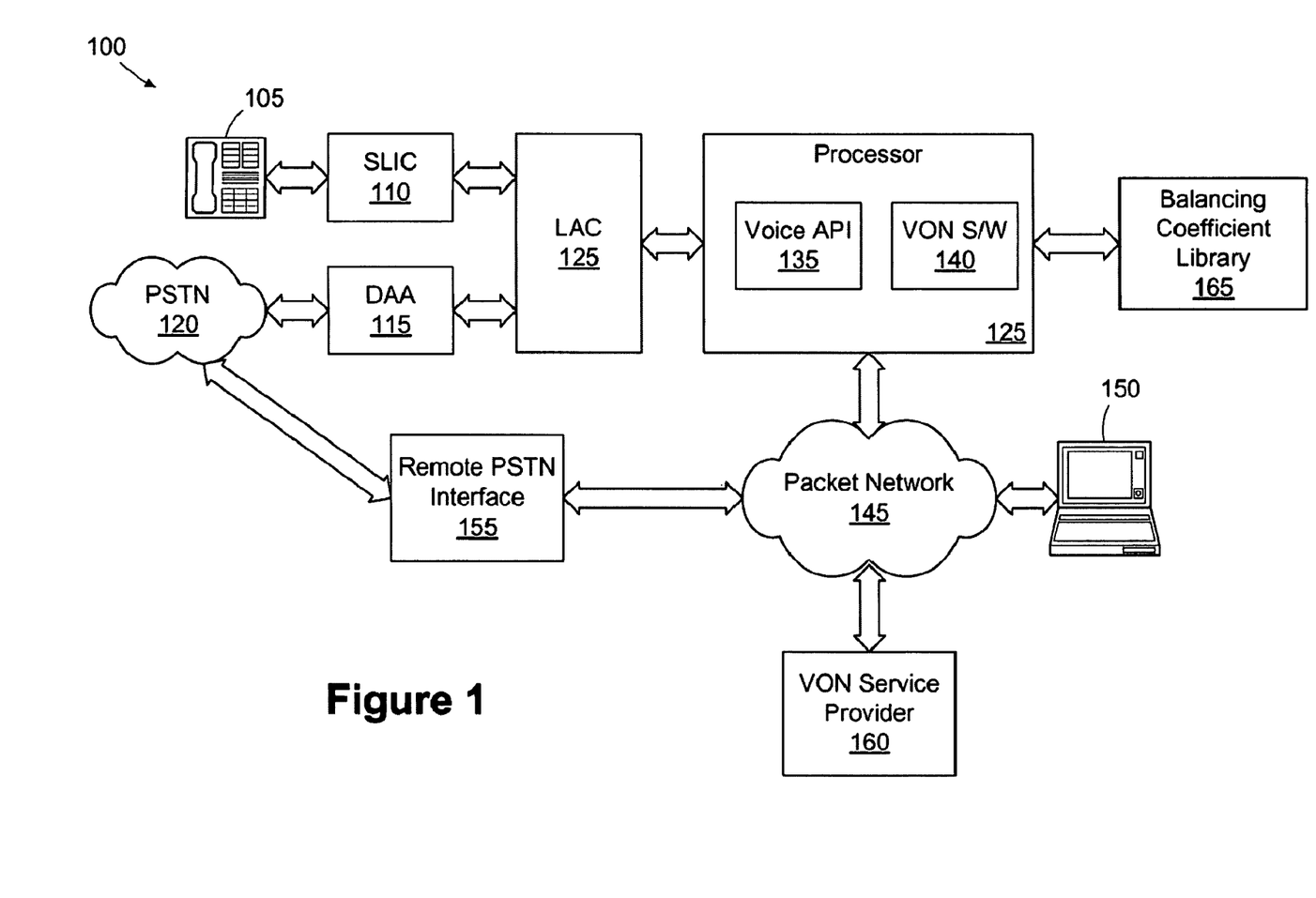
FIG. 1 is a simplified block diagram of a communication system in accordance with one embodiment of the present subject matter.

Referring now to the drawings wherein like reference numbers correspond to similar components throughout the several views and, specifically, referring to FIG. 1, the disclosed subject matter shall be described in the context of a communication system 100. The communication system 100 includes a telephony device 105 coupled to a subscriber line interface circuit (SLIC) 110, a direct access arrangement (DAA) device 115 coupled to the publically switched telephone network (PSTN) 120, a line audio controller (LAC) 125, a processor 130 executing a voice application programming interface (API) 135 and a voice over network (VON) telephony software application 140 and connected to a packet network 145, such as the Internet or other packet based network, a remote telephony device 150, and a remote PSTN interface device 155. In general, the system 100 allows call to be routed over the PSTN 120 or the packet network 145 depending on the particular call situation. In general, the LAC 125 provides a simplified adaptive balancing capability that aids in echo cancellation.

Calls that are considered local with respect to the location of the connection to the PSTN 120 may be routed over the PSTN 120, while domestic toll or international calls may be routed over the packet network 145 to the remote PSTN interface device 155 that is local with respect to the call recipient. In the case where the remote telephony device 150 is not coupled to the PSTN 120, the call may be routed over the packet network 145. In yet another example, a call may be placed by the user of the remote telephony device 150 (e.g., which may be implemented on a laptop computer) to a recipient that is local on the PSTN 120. Hence, the user may connect through the remote telephony device 150 while travelling without incurring toll charges or hotel surcharges.

The processor 130 executes the VON software application 140 to handle the packet-based communication. The VON software application 140 may communicate with a VON service provider 160 on the packet network 145 responsible for routing the call to the appropriate destination, such as the remote telephony device 150 or the remote PSTN interface device 155. The voice API 135 provides an interface between the system hardware and the VON software application 140.

The SLIC 110 and DAA 115 provide the electrical interfaces for a foreign exchange subscriber (FXS) circuit and a foreign exchange office (FXO) circuit, respectively, whereas the LAC 125 provides higher-level functions, such as audio signal conversion and processing, worldwide impedance matching and call control signal generation and detection. The voice API 135 initializes the FXS and FXO ports to their corresponding application or country-specific AC and DC parameters, ringing and other signaling characteristics, and configures the switcher. The voice API 135 provides high-level control over the telephony functions.

The construct and operation of the DAA 115 are known to those of ordinary skill in the art. Hence, for the sake of simplicity and to avoid obscuring the present subject matter, the details of its construction are not provided. In general, the DAA 115 provides an insulation barrier between the line side and the system side, as required for FXO circuits. This barrier divides provides high voltage insulation. The DAA 115 may include capacitors made from the printed circuit board (PCB) mounting. In the illustrated embodiment, the DAA 115 is an analog chip that passes an analog pulse width modulated (PWM) signal thru the capacitors to transfer the analog signals to the LAC 125.

Figure 2:
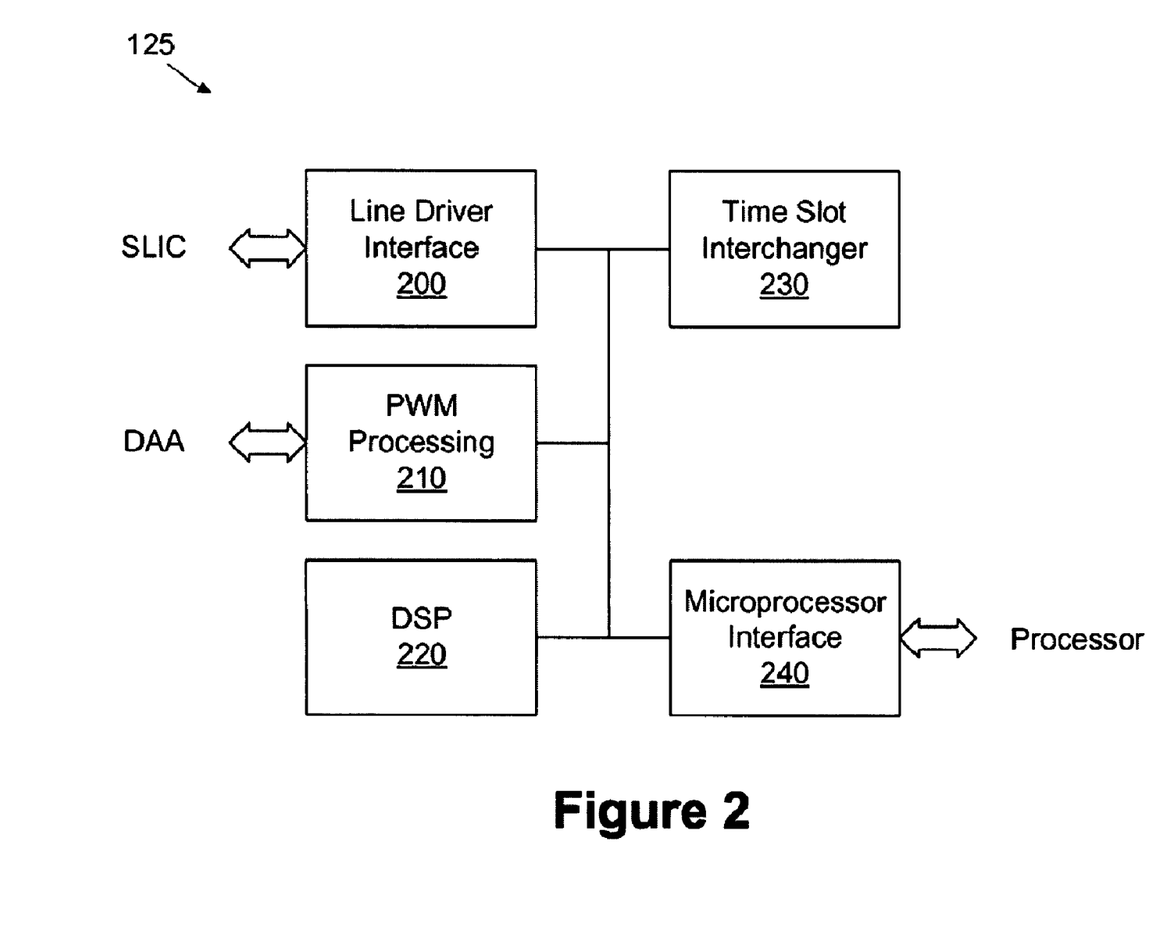
FIG. 2 is a simplified block diagram of a line audio controller in the system of FIG. 1.

A simplified block diagram of the LAC 125 is shown in FIG. 2. The LAC 125 includes a line driver interface 200 for communicating with the SLIC 110, a PWM processing block 210 for communicating with the DAA 115, a digital signal processor (DSP) 220, a time slot interchanger 230, and a microprocessor interface (MPI) 240. Other functional units may be implemented in the LAC 125, however, the following illustration relates to the functional units that cooperate to provide adaptive balancing for echo cancellation, and such other units are not shown or described.

The PWM processing block 210 functions on the receive and transmit paths to convert between analog PWM signals and digital signals. On the receive side, the PWM processing block 210 receives a differential PWM signal from the DAA 115 and converts the PWM single ended signal to a binary number. This conversion resembles an A/D conversion in function except that the conversion is done by timing the width of the analog PWM signal. The PWM processing block 210 also receives periodic signaling messages from the line side device and provides those signaling messages to the MPI 240. On the transmit side, the PWM processing block 210 converts the digital word into an analog pulse width modulated signal, and may also add signaling messages into the stream for DAA 115. The time slot interchanger 230 provides for compatibility with other codec devices (not shown) in the system 100.

Figure 3:
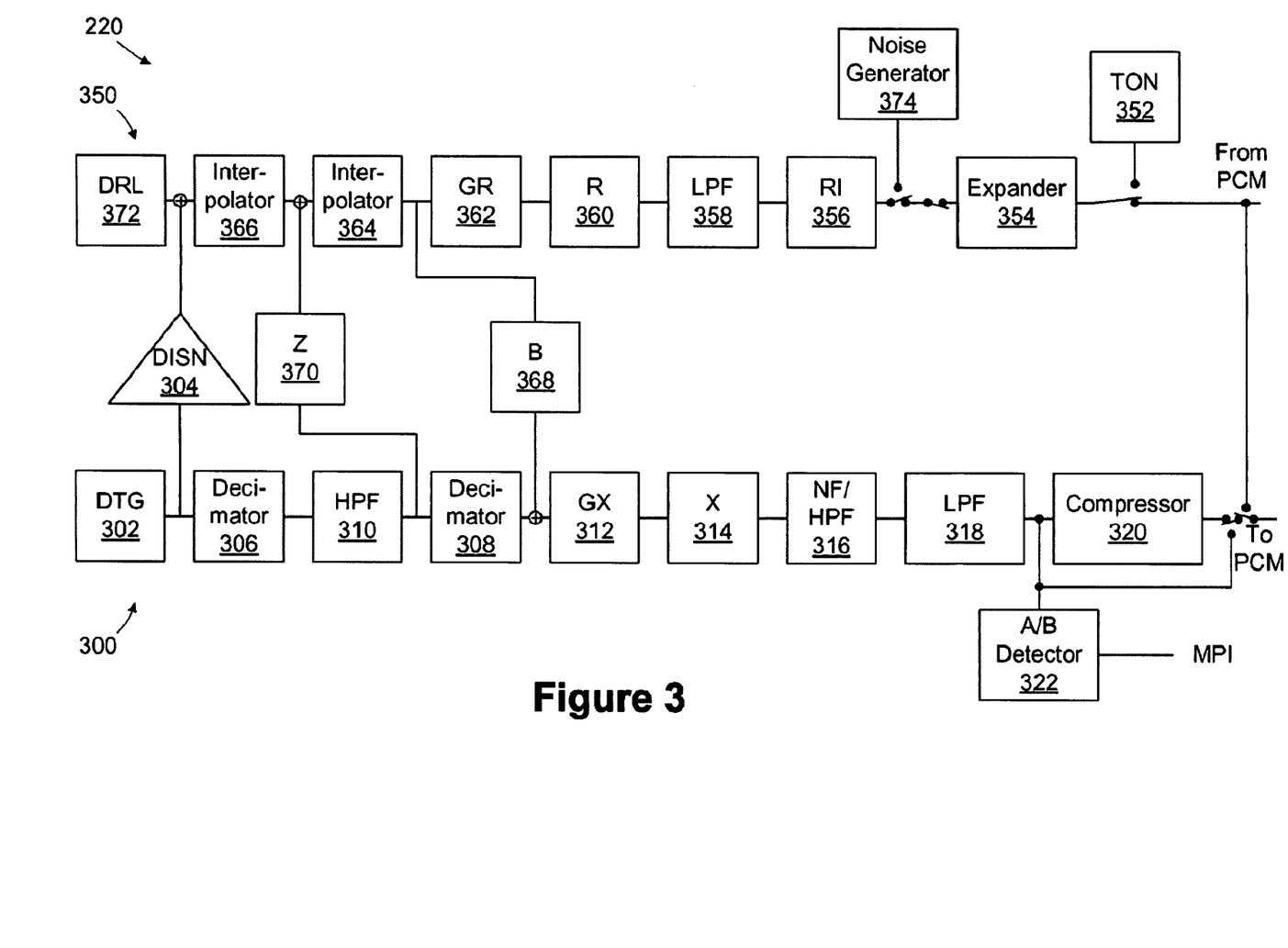
FIG. 3 is a simplified block diagram of a digital signal processor in the line audio controller of FIG. 2.

Turning now to FIG. 3, a simplified block diagram illustrating the operation of the DSP 220 with respect to the processing of transmit and receive signals is provided. The DSP 220 implements a transmit path 300 and a receive path 350. The particular implementation of the transmit and receive paths 300, 350 may vary. The particular modules described in FIG. 3 are provided for illustrative purposes, and may vary depending on the particular implementation.

The transmit path 300 includes a digital transmit gain (DTG) filter 302, a digital impedance scaling network (DISN) filter 304, decimators 306, 308, a high pass filter 310, a transmit gain (GX) filter 312, a transmit (X) filter 314, a notch filter and high pass filter (NF/HPF) 316, a low pass filter (LPF) 318, a compressor 320 and an adaptive balance detector 322.

The DTG filter 302 allows a programmable boost or attenuation of the signal (e.g., by 6 dB). The DTG filter 302 is coordinated with the DISN filter 304 when gain or loss is inserted. The DISN filter 302 allows a digital gain or loss feedback path between the line sensed audio and the driven audio. This roughly allows a boost or decrease in the driver impedance which is approximately set by components attached to the line side interface.

The decimator 306 changes the effective sampling rate from 1/64 kHz to 1/32 kHz, increases the word bit width by 1 bit, and adds some noise shaping. The high pass filter 310 blocks DC component that the audio is riding on and prevents main power frequencies from passing through. The decimator 308 further changes the effective sampling rate from 1/32 kHz to 1/8 kHz, increases the word bit width by 2 bits, and adds additional noise shaping. The GX filter 312 allows for digital gain adjustment to the audio signal coming from the DAA 115. The X filter 314 is a finite impulse response (FIR) filter that provides frequency response adjustment, which is employed when the line driving impedance is modified to a reactive value. The NF/HPF block 316 provides noise filtering and additional mains frequency attenuation. The LPF 318 produces a 4 kHz cutoff for the 1/8 kHz sampling rate. The compressor 320 is employed when audio compression (e.g., u-law or a-law) is used. This compression reduces the word width from 16 bits to 8 bits, and it not typically used when linear code is employed (i.e., the compressor is bypassed). The digital audio signal is a pulse-code modulated (PCM) signal that is provided through the MPI 240 to the voice API 135 and VON software application 140 to be packetized and, if desired, to implement additional codec functionality.

The receive path 350 includes a tone generator (TON) 352, an expander 354, a receive impulse (RI) filter 356, a low pass filter (LPF) 358, a receive (R) filter 360, a receive gain (GR) filter 362, interpolators 364, 366, a balancing (B) filter 368, a feedback (Z) filter 370, a digital receive loss (DRL) 372, and a noise generator 374.

The tone generator 352 allows a 1000 Hz tone to be injected toward the DAA 115. If the filters and gain blocks are set correctly, a 0 dBm signal is seen at the DAA 115. The expander 354 is employed when compression (e.g., u-law or a-law) is compression is being used, and may be bypassed when linear code is employed. This expansion increases the word width from 8 bits to 16 bits. The RI filter 356 is a programmable 1-pole infinite impulse response (IIR) filter used for equalization of the receive path 350. The programmability of the RI filter 365 allows compatibility with different worldwide constraints. The R filter 360 is an FIR filter that provides frequency response adjustment, which is employed when the line driving impedance is modified to a reactive value. The GR filter 362 allows for digital gain adjustment to the digital signal going to the DAA 115. The interpolator 364 changes the effective sampling rate from 1/8 kHz to 1/32 kHz and decreases the word bit width by 2 bits. The interpolator 366 changes the effective sampling rate from 1/32 kHz to 1/64 kHz and decreases the word bit width by 1 bit. The balancing filter 368 provides the echo cancellation for the line side device. The B filter 368 includes several FIR stages and one infinite impulse response (IIR) stage that are adjustable to provide the cancellation. As will be described in greater detail below, the coefficients for the B filter 368 (and all the other programmable filters) come from the MPI 240. The Z filter 370 provides a feedback signal that allows adjustment of the driving impedance of the line interface. The Z filter 370 allows a more precise setting of the drive impedance (i.e., which should be matched to the line impedance for optimum power transfer, best frequency response, and best echo performance). The Z filter 370 has coupled gain adjustment with the DRL 372 and the DTG filter 302 to compensate for those gain or loss additions. The DRL filter 372 allows a programmable attenuation of the signal by 6 dB. This DRL filter 372 is coordinated with the DISN filter 304 when loss is inserted.

In general, the coefficients for the DRL, DTG, DISN, Z and B blocks 372, 302, 304, 370, 368 provide a starting point for field adjustments of gains or impedances; hence, the coefficients are determined before the GR, GX, X, RI, and R blocks 362, 312, 314, 356, 360 are set up.

The adaptive balance detector 322 and the noise generator 374 cooperate to allow adaptive setting of the balancing filter 368 to improve echo cancellation response. In general, the VON software application 140 controls the balancing through the voice API 135. At a high level, the noise generator 374 injects a noise signal and the adaptive balance detector 322 measures the average reflected power to measure the effectiveness of the echo cancellation.

The noise generator 374 is a pseudo-random noise source that operates to place the channel for which the feature is being activated to be approximately ready for a test. To prepare for a test, the noise generator 374 is initialized, the PCM path way is cut off to avoid influencing the result, and the adaptive balance detector 322 is preconditioned. In the illustrated embodiment, the pseudo random noise source is injected as a 16 bit linear code between the RI filter 356 and the expander 354. The receive path 350 is cut-off between the PCM highway and the expander 354. Injection at this location provides that any frequencies above the telephony band are removed. Upon activation of the noise generator 374, the digital path cut-off is automatic and the expander 354 is set to linear mode. The previous mode for the expander 354 may be restored on de-activation of the noise generator 374. The R filter 360 and GR filter 362 are available for level adjustment and noise shaping if desired. The R and GR blocks 360, 362 are not automatically modified. In some embodiments, the GR filter 362 may be set to increase attenuation for the measurement process as the peak level may be higher than some networks might allow on their circuits. For example, an adjustment on the order of −6 dB may be used.

The adaptive balance detector 322 is connected between the LPF 318 and the compressor 320. The adaptive balance detector 322 is configured to receive 16 bit linear code, so the compressor 320 is disabled. The compressor 320 may be switched from the normal mode setting to linear and the transmit path cut-off when the noise generator 374. The mode of the compressor 320 may be restored on de-activation of the noise generator 374, and the transmit path cut-off should be restored. The filtering in the transmit path 300 is also available for gain adjustment and for noise shaping, as required. The GX filter 312 or X filter 314 are not changed automatically, but the GX filter 312 may be set for increased gain (i.e., reduced attenuation) during the measurement to increase sensitivity.

Figure 4:
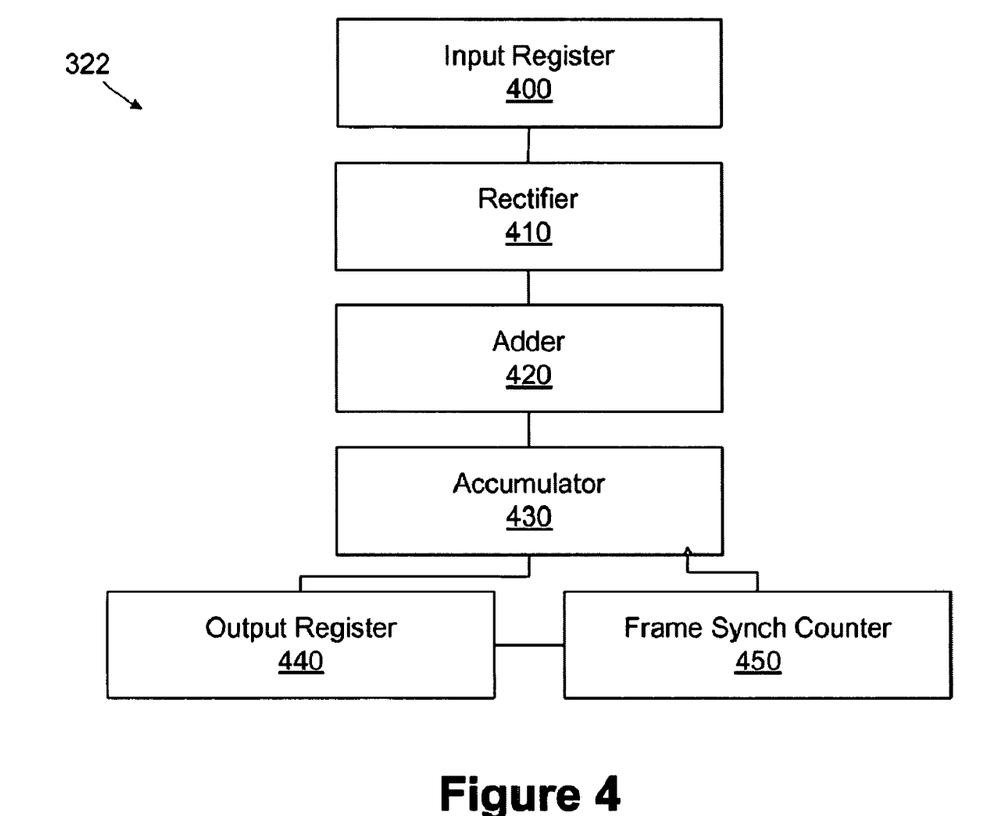
FIG. 4 is a simplified block diagram of an adaptive balance detector in the digital signal processor of FIG. 3.

A simplified block diagram of the adaptive balance detector 322 is provided in FIG. 4. The adaptive balance detector 322 includes a serial-in parallel-out (SIPO) input register 400, a rectifier 410, an adder 420, an accumulator 430, an output register 440, and a frame synch counter 450.

The adaptive balance detector 322 receives incoming 16 bit samples at an 8 Ksps rate in the input register 400. Each of these signal samples are processed as if they were full-wave rectified using the rectifier 410. The incoming sample is a 2's complement representation. To achieve a good approximation to rectification (i.e., a simplification with a small error), the negative sample may be inverted for all bits as controlled by the sign bit. For complete rectification, one LSB should be added; however, the error associated with neglecting this bit is very small for a 15-bit plus sign bit sample.

Each 16 bit sample at 8 Ksps that has been rectified by the rectifier 410 is summed in the adder 420 and stored in the accumulator 430. The adder 420 adds the current sample in the rectifier 410 to the current value stored in the accumulator 430 and stores the result back into the accumulator 430. A predetermined number of samples (e.g., 256) are summed then resampled and the accumulator 430 is cleared and restarted on a new sample set. The sampled output of the accumulator 430 is converted to a 16 bit word and stored in the output register 440, which may be read by the MPI 240. An interrupt flag is generated by the frame synch counter 450 to enable the VON software application 140 to retrieve the latest detector sample. In one embodiment, the transmit data register (not shown) could be shared as the location for the detector output to be read via the MPI 240. The ATI interrupt could also be shared for signaling the availability a sample when the adaptive balance detector 322 is enabled. The same test select currently available for selecting the transmit data may be used to enable the detector feature.

Assuming the peak signal driven toward the 2W line is roughly full scale, the average signal level should be approximately 10-12 dB lower than the peak. Assuming the 2W to 4W hybrid provides 6-10 dB of hybrid loss, the average level sent to the detector would be −16 dB to −22 dB relative to full scale. Accordingly, the accumulator 430 is configured to accommodate numbers between 666,880 and 1,325,312. The accumulator 430 could see a THL as poor as 0 dB. This would require the accumulator to sum up to 2,652,711. Hence, the accumulator 430 is configured to handle at least 22 bits. In the illustrated embodiment, the default period for averaging is 32 mS (256 samples at 8 ksps). A different averaging period may be provided. The result placed in the output register 440 for read by the VON software application 140 on interrupt is an unsigned positive number from 0 to 32768. Bit 15 indicates that an error or overflow condition existed during the measurement period.

The adaptive balance detector 322 may be used during voice operations. By selecting a shorter sampling period, short tone bursts may be measured for amplitude. The receive data should be interrupted and the system should be in the linear mode to make such a measurement.

The testing for hybrid balance requires a nearly full bandwidth signal spectrum, which requires the use of a noise-like signal for testing. A simple method of generating a noise-like signal is to utilize a linear feedback shift register to obtain digital sample words which are random noise-like. In the illustrated embodiment, the signal generated by the noise generator 374 is a 16-bit linear code word at an 8 Ksps rate. A simple solution for the noise generator 374 is a 16-bit shift register configured to give a maximal length sequence (all 65536 code words). The sequence of these code words would repeat every 512 mS. The sent samples do not include a DC component or the AC signal may produce an interference with the loop current. In the illustrated embodiment, the noise generator 374 includes a linear feedback shift register (LFSR) and a sampling register. The LFSR has a seed value that is used to start the LFSR at a known state. This known state for the shift register prevents the sequence from short cycling or deviating from the maximal repeat length the function is designed to create. In general, the random sequence should not repeat during the averaging period. Any of several LFSR polynomials could be used to produce the sequence. For example, a Galois polynomial may be used in some embodiments to produce the maximal length sequence The sample sequence consists of un-signed integers from 0 to 65535. These raw integers can be interpreted as sign plus magnitude numbers in a 2's complement form since all possible codes are being sent. This does imply that the samples of the code sequences are likely to have a DC component to them; hence some form of high pass DC block is required. This is reinforced by the fact that the process uses significantly less than the entire sequence.

If the code generation does not complete a cycle within the averaging period, the waveform average will not always be near zero. This implies a DC component in the sent samples. This situation is acceptable, provided the D/A direction does not pass any DC component to the 2W line. Filtering the high frequency content of the waveform created by the noise generator 374 should result in a reasonable test signal for the adaptive balance detector 322.

The operation of the system 100 during an adaptive balancing test sequence is now described. The VON software application 140 accesses a library 165 of balancing filter coefficients. Each coefficient set includes coefficient values for each tap of the balancing filter 368. The library 165 may include groups of coefficients for different installation locations. For example, the coefficients may be divided into different groups for different countries and/or regions. During the set up of the system 100, a user may enter the location, and the VON software application 140 may select a group of candidate coefficient sets that are applicable to the particular location. Each group of balancing filter coefficients provide for variation around a specific target compromise impedance. The group provides variation in the real component (higher and lower) and variation in the complex portion of the impedance. In one embodiment, the VON software application 140 may identify a group of 6-8 coefficient sets. In general, the VON software application 140 cycles through each set of coefficients in the group, while using the noise generator 374 and the adaptive balance detector 322 to determine the lowest reflected energy. The coefficient set in the group having the lowest reflected energy is used the configure the balancing filter 368.

During the test sequence the FXO 2W line interface in the DAA 115 is off-hook to provide proper transmission results. The VON software application 140 loads a first set of balancing coefficients from the identified region grouping into the balancing filter 368. The noise generator 374 is enabled and the adaptive balance detector 322 is started. The output register 440 is sampled when the interrupt occurs. The VON software application 140 temporarily stores the 16 bit result. A new set of balancing filter coefficients from the region grouping is loaded and the output register 440 is sampled again after the second interrupt that occurs after loading the coefficients. The VON software application 140 waits for the second interrupt to allow the DSP 220 to settle and allow the adaptive balance detector 322 to see data stream after the coefficients have been loaded. Generally, each coefficient set will take between 32 and 64 mS to evaluate. The results of the adaptive balance detector 322 for the various coefficient sets are compared and the coefficient set producing the lowest detector output is chosen and reloaded. The noise generator 374 is then disabled.

During the test sequence, the X and R filters, 314, 360 may be used to weight the result by shaping the noise used for the test. By attenuating low frequencies, emphasis is given to high frequencies in the balance evaluation. Approximately 1 dB variation will occur between samples of the sent noise sequence. This means that the measurement of a given coefficient set, if taken multiple times could differ in magnitude by ±/+11%. Although, this may appear to represents a significant amount, the VON software application 140 is looking for changes of more than 50% to 70% between measurements for coefficient sets to make a significant difference in balance (e.g., 2-3 dB).

The MPI 240 allows access to all the programmable filters by allowing their coefficients to be written and read. It also allows reading line signaling and creating line signaling (on-off hook). The MPI may support many diagnostic functions, which include but are not limited to, reading off-hook line current and on-hook line voltage. The MPI 240 also controls the detection of ringing voltage applied at the line interface. It can read or create audio signal samples and various functions. In the illustrated embodiment, the MPI 240 may be accessed via a separate serial bidirectional interface (i.e., separate from the serial digital audio I/O), and may have separate timing from the digital audio I/O.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. A communication system, comprising:
    a transmit path operable to generate data for communication on a communication network;
    a receive path operable to receive data from the communication network;
    a balancing filter coupled between the transmit path and the receive path;
    a noise generator operable to inject a noise signal on the receive path;
    a detector operable to measure reflected power in the transmit path associated with the noise signal, comprising:
        an input register operable to receive a transmit sample, the transmit sample including a sign bit;
        a rectifier operable to rectify the transmit sample based on the sign bit;
        an accumulator operable to store an average power value;
        an adder operable to add the rectified transmit sample to the average power value and store a result in the accumulator;
        a counter operable to generate an interrupt; and
        an output register operable to receive the average power value stored in the accumulator at the time of the interrupt;
    an interface operable to receive a plurality of predetermined sets of coefficients for configuring the balancing filter, wherein the detector is operable to measure the reflected power for each of the sets of coefficients; and
    a processor coupled to the interface and operable to provide the sets of coefficients, receive the reflected power measurements, and configure the balancing filter using the set of coefficients having the lowest measured reflected power.

2. The system of claim 1, further comprising a library of coefficient sets, wherein the processor is operable to select a group of the coefficient sets from the library based on a location of the connection to the communication network.

3. The system of claim 1, wherein the receive path includes at least one configurable filter operable to receive a filter coefficient and alter the noise signal based on the received filter coefficient.

4. The system of claim 1, wherein the processor is operable to provide the sets of coefficients; and receive the reflected power measurements by accessing the output register responsive to the interrupt.

5. The system of claim 1, wherein the communication network comprises a publically switched telephone network.

6. The system of claim 1, wherein the processor is operable to communicate voice over network data from a packet network using the transmit and receive paths.

7. A system, comprising:
    a digital access arrangement coupled to a communication network;
    a subscriber line interface circuit operable to communicate with a telephony device; and
    a line audio controller operable to communicate with the digital access arrangement and the subscriber line interface circuit, the line audio controller comprising:
        a transmit path operable to generate data for communication on the communication network;
        a receive path operable to receive data from the communication network;
        a balancing filter coupled between the transmit path and the receive path;
        a noise generator operable to inject a noise signal on the receive path;
    a detector operable to measure reflected power in the transmit path associated with the noise signal, comprising:
        an input register operable to receive a transmit sample, the transmit sample including a sign bit;
        a rectifier operable to rectify the transmit sample based on the sign bit;
        an accumulator operable to store an average power value;
        an adder operable to add the rectified transmit sample to the average power value and store a result in the accumulator;
        a counter operable to generate an interrupt; and
        an output register operable to receive the average power value stored in the accumulator at the time of the interrupt;
    an interface operable to receive a plurality of predetermined sets of coefficients for configuring the balancing filter, wherein the detector is operable to measure the reflected power for each of the sets of coefficients; and
    a processor coupled to the interface and operable to provide the sets of coefficients, receive the reflected power measurements, and configure the balancing filter using the set of coefficients having the lowest measured reflected power.

8. The system of claim 7, further comprising a library of coefficient sets, wherein the processor is operable to select a group of the coefficient sets from the library based on a location of a connection between the digital access arrangement and the communication network.

9. The system of claim 7, wherein the receive path includes at least one configurable filter operable to receive a filter coefficient and alter the noise signal based on the received filter coefficient.

10. The system of claim 7, wherein the processor is operable to provide the sets of coefficients and receive the reflected power measurements by accessing the output register responsive to the interrupt.

11. The system of claim 7, wherein the communication network comprises a publically switched telephone network.

12. The system of claim 7, wherein the processor is operable to communicate voice over network data from a packet network using the transmit and receive paths.

13. A method, comprising:
generating data in a transmit path for communication on a communication network;
receiving data in a receive path from the communication network;
providing a balancing filter coupled between the transmit path and the receive path;
injecting a noise signal on the receive path;
measuring reflected power in the transmit path associated with the noise signal by receiving a transmit sample including a sign bit, rectifying the transmit sample based on the sign bit, accumulating an average power value, adding the rectified transmit sample to the average power value, generating an interrupt, and outputting the average power value at the time of the interrupt as the measured reflected power; and
receiving a plurality of predetermined sets of coefficients for configuring the balancing filter;
repeating the injecting and measuring to measure the reflected power for each of the sets of coefficients; and
configuring the balancing filter using the set of coefficients having the lowest measured reflected power.

14. The method of claim 13, wherein the receive path includes at least one configurable filter operable to receive a filter coefficient and alter the noise signal based on the received filter coefficient.

15. The method of claim 13, wherein the communication network comprises a publically switched telephone network.

16. The method of claim 14, further comprising communicating voice over network data from a packet network using the transmit and receive paths.

* * * * *